United States Patent
Maletsky

[11] Patent Number: 6,104,279
[45] Date of Patent: Aug. 15, 2000

[54] METHOD OF COMMUNICATION BETWEEN A PLURALITY OF REMOTE UNITS AND A CONTROL UNIT

[75] Inventor: Kerry Maletsky, Monument, Colo.

[73] Assignee: Atmel Corporation, San Jose, Calif.

[21] Appl. No.: 09/046,374

[22] Filed: Mar. 23, 1998

[51] Int. Cl.[7] .................................................. H04Q 5/22
[52] U.S. Cl. ......................................... 340/10.41; 370/458
[58] Field of Search .................................... 370/445, 447, 370/448, 462, 443; 340/825.49, 825.54, 825.55, 825.5, 825.44, 825.34; 342/44, 42; 455/524, 552, 556, 557, 558; 375/1

[56] References Cited

U.S. PATENT DOCUMENTS

| | | | |
|---|---|---|---|
| 5,053,774 | 10/1991 | Schuermann et al. | 342/44 |
| 5,294,931 | 3/1994 | Meier | 342/44 |
| 5,365,551 | 11/1994 | Snodgrass et al. | 375/1 |
| 5,434,572 | 7/1995 | Smith | 342/44 |
| 5,457,461 | 10/1995 | Schuermann | 342/42 |
| 5,489,908 | 2/1996 | Orthmann et al. | 342/42 |
| 5,500,650 | 3/1996 | Snodgrass et al. | 342/42 |
| 5,602,538 | 2/1997 | Orthmann et al. | 340/825.54 |
| 5,771,462 | 6/1998 | Olsen | 455/524 |

*Primary Examiner*—Michael Horabik
*Assistant Examiner*—Matsuichiro Shimizu
*Attorney, Agent, or Firm*—Thomas Schneck

[57] ABSTRACT

In a communication system comprising a base station and a plurality of asynchronously operating remote units, a method of communication between the base station and each of the remote units includes each remote unit randomly transmitting a first bit pattern to the base unit. Upon detecting the reception of an error-free bit pattern, the base unit transmits an ACK during a first window of time. The remote unit which detects the ACK during a corresponding first window of time becomes the selected unit and thereafter communicates with the base station. All other remote units continue monitoring for the transmission of a command belonging to a first set of commands, afterwhich the selected unit goes into a quiet mode and the unselected units resume their random transmissions of the first bit pattern to the base unit.

27 Claims, 4 Drawing Sheets

METHOD OF COMMUNICATION BETWEEN A PLURALITY OF REMOTE UNITS AND A CONTROL UNIT

TECHNICAL FIELD OF THE INVENTION

The present application relates generally to a digital data communication protocol and more specifically to communication with a plurality of remote units, the number and identities of which are unknown.

BACKGROUND OF THE INVENTION

Some communication systems consist of a base station and a plurality of remote units deployed within a communication field about the base station. Typically, the base station collects information contained in the remote units and may write information into the remote units. The communication field may consist of copper or fiber optic links between the base station and each remote unit. Alternatively, the communication field may be in the form of radio wave transmissions between the base station and the remote units. An example of the latter is a system employing radio frequency identification devices (RFIDs) which are attached to items such as livestock, luggage in airport luggage handling system, personnel badges in a security area, and so on. An interrogator unit (also referred to as a reader unit) broadcasts radio frequency signals to the RFIDs (also referred to as tags), modulated to convey information to the tags. Modulation circuitry in the tags permit transmission of information back to the base station.

In most applications, many tags are present in the interrogation field so that a transmission from the base station typically will be detected by more than one tag. Thus, a request by the base station for information contained in a tag can produce multiple transmissions from many tags, resulting in a garbled response detected at the base station. Conversely, information intended for a tag particular will be picked up by all tags within the interrogation field.

These problems can be avoided by transmitting identifying information so that only the target tag will respond. Oftentimes, however, the base station does not know a priori which tags are deployed within the interrogation field. Moreover, it is often the case that tags enter and leave the interrogation field as a result of the dynamic nature of the environment in which RFID tags are used. Identification schemes have been developed wherein the base station initiates a process by which the deployed tags are identified.

For example, in U.S. Pat. Nos. 5,365,551 and 5,500,650 a system and method are taught wherein a commander station (reader unit) transmits a command to the responder stations (tags), causing each responder to generate a random number which thereafter serves as an arbitration number to identify the responder. The commander station then collects the arbitration number of each responder, thus permitting the commander station to subsequently communicate directly with any one responder station.

In U.S. Pat. No. 5,434,572, a method is disclosed for accessing a desired tag by progressively eliminating the other tags. Each tag is assigned a unique binary ID number having N bit positions. The reader transmits bit commands to the tags. One such command, the BIT0 command, causes each tag whose current bit position is '0' to respond and each tag whose current bit position is '1' to go into reset. Similarly, a BIT1 command causes each tag whose current bit position is '1' to respond and each tag whose bit position is '0' to go into reset. A response by the tag includes transmitting a return signal and incrementing an internal counter to the next bit position. The reader can therefore gain access to a tag of a given binary ID by issuing an appropriate sequence of BIT0 and BIT1 commands, thus successively putting the undesired tags into reset until only the desired tag remains active.

In U.S. Pat. No. 5,489,908 a system is disclosed for multiple tags wherein each tag has a unique id code. The reader constructs a bit string which is sent to the tags. Each tag compares the bit string against the least significant bits of its id code, and if a mismatch occurs the tag does not respond. Whenever the reader detects multiple responses to a transmission, an additional bit is appended to the bit string and the modified string is transmitted. Additional bits are successively appended until the reader detects that a single response has been received, at which point the code is stored. The entire sequence is repeated until the id codes for all of the tags in the field are recorded.

In U.S. Pat. No. 5,602,538, a multiple tag system is taught wherein the tags transmit their id codes in response to receiving an interrogation command from the reader. The signal from the tag closest to the reader is detected and its id code is stored. The reader then transmits another interrogation command including the received id code. All tags respond by sending their id codes, with the exception of the tag whose id code is included in the transmission. Again, the reader detects the strongest signal and records the id code contained in the signal. The reader transmits yet another interrogation command, this time including the first and the second id codes. Again, all tags respond with their id codes, with the exception of the two tags whose id codes are contained in transmission. The reader detects the strongest signal and stores the id code contained in the signal. This is repeated until all the tags in the interrogation field have been identified.

U.S. Pat. No. 5,294,931 teaches a different approach whereby individual tags are accessed in a multi-tag environment based on each tag's proximity to the reader unit. Each tag is configured to respond to interrogation only when charge voltage generated by the interrogation pulse falls within a fixed voltage range. Thus when the reader emits an interrogation pulse at a given energy, tags close to the reader will be charged at voltage levels above the voltage range and thus will not respond. Similarly, distant tags will be charged at levels below the voltage range and thus will not respond. Only a tag which is located at a proper distance from the reader will be charged to a level that falls within the voltage level and thus will respond to the reader. By varying the energy of the emitted pulse, the reader is capable of interrogating all of the tags in its field.

Each of these prior art approaches require additional circuitry and/or intelligence in the base station and/or the RFID tag to implement an identification protocol. The '931 patent, for example, requires precision components in the tags in order to detect the narrow voltage windows within which operation is permitted.

A need therefore exists for an RFID tag identification method that minimizes the complexity of the design and implementation of the base station and the RFIDs comprising the system. It is desirable to have a method that is applicable to similar communication systems wherein a control unit communicates with two or more remote units.

SUMMARY OF THE INVENTION

In a communication system having a base station and a plurality of remote units, a method of communication in accordance with the present invention comprises, in the remote units, delaying for a random period of time and transmitting a first bit pattern. Upon receiving an error free bit pattern, the base station transmits an acknowledge pulse. If a remote unit detects the transmission of the acknowledge pulse during a first period of time subsequent to its transmission of the first bit pattern then the remote unit (now referred to as the selected remote unit) transmits a second bit pattern. The base station, upon detecting the second bit pattern, transmits one or more commands which the remote unit detects and executes. The base station broadcasts a master signal which serves as a time base for both the base station and the remote units for measuring the passage of time.

If a remote unit detects any transmission outside of the first period of time then the remote unit remains quiet and monitors for the transmission of a first or a second command. In such a case all such remote units re-transmit the first bit pattern at random intervals. The selected remote unit, upon detecting the first command, enters a state of monitoring for the second command.

If a remote unit does not detect any transmissions for a randomly selected period of time subsequent to the first period of time then the remote unit continues to transmit the first bit pattern at random intervals.

In a preferred embodiment of the invention, the remote units are radio frequency identification devices and the base station is a reader unit. The first command is a SET QUIET BIT command and the second command is a RESET QUIET BIT command.

BEST MODE FOR CARRYING OUT THE INVENTION

Figure 1A:
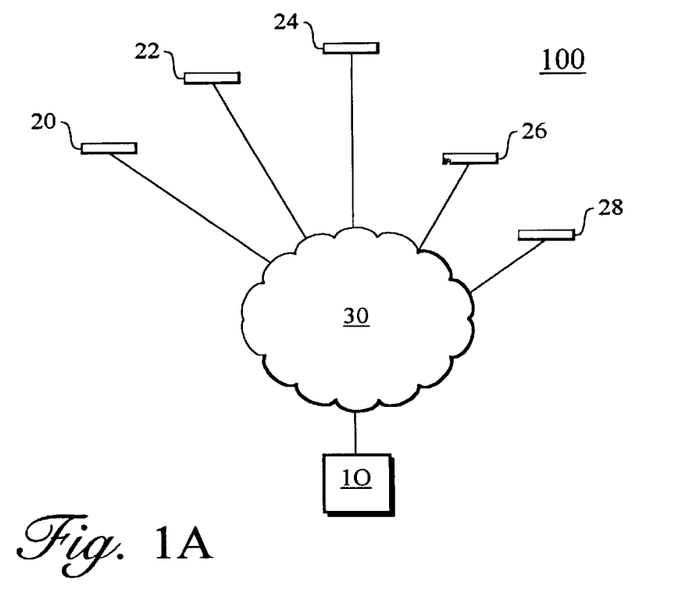
FIGS. 1A and 1B show a generic illustration (FIG. 1A) of multiple remote units in communication with a base unit, and a specific example (FIG. 1B) of such a communication system.

Referring to FIG. 1A, the present invention is directed to communication system 100 which comprises a central control unit (base station) 10 and a plurality of remote units 20–28. The system is characterized in that base station 10 communicates with remote units 20–28 by broadcasting signals over a communication medium 30 simultaneously to all of the remote units. Similarly, the remote units communicate by broadcasting signals over the same medium to base station 10. The system is further characterized in that remote units 20–28 operate asynchronously with respect to one another, including transmitting information to base station 10.

Although the communication method of the present invention is applicable in many communication environments, the method has been reduced to practice in the area of radio frequency identification devices (RFIDs). Thus, the discussion which follows will be directed to an RFID application, keeping in mind the applicability of the method to systems such as those listed above.

Figure 1B:
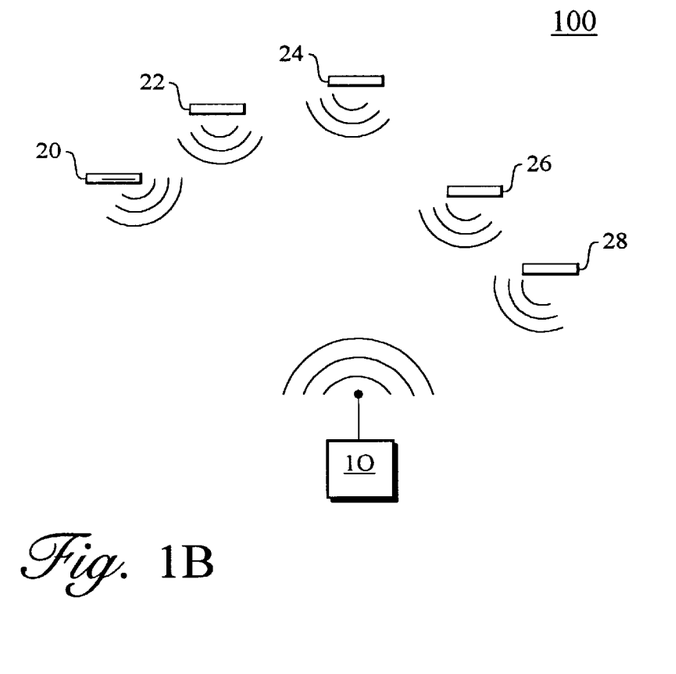

Referring to FIG. 1B, a typical RFID application comprises a base station (interrogation unit, reader unit, etc.) 10 and a plurality of RFIDs (tags) 20–28 deployed within the interrogation field of the reader unit. The principles of communication are known. Briefly, reader unit 10 transmits a carrier frequency radio signal which is detected by the tags. The tags derive their power by rectifying the received RF carrier and charging a storage capacitor with the rectified signal. Information is conveyed to a tag by modulating the RF carrier, which the tag detects and demodulates. The tag reflects the incident RF carrier back to the reader unit and in this manner communicates with the reader unit. Thus, information is "transmitted" back to the reader unit by modulating the reflected signal.

Typically, a tag comprises circuitry to rectify the RF carrier and a modulated tank circuit to cause a reflection of the RF carrier (i.e. transmit information) back to the reader unit. In addition, the tag is equipped with a memory store such as an EEPROM to store data such as an identification number and other information in the tag.

Figure 2:
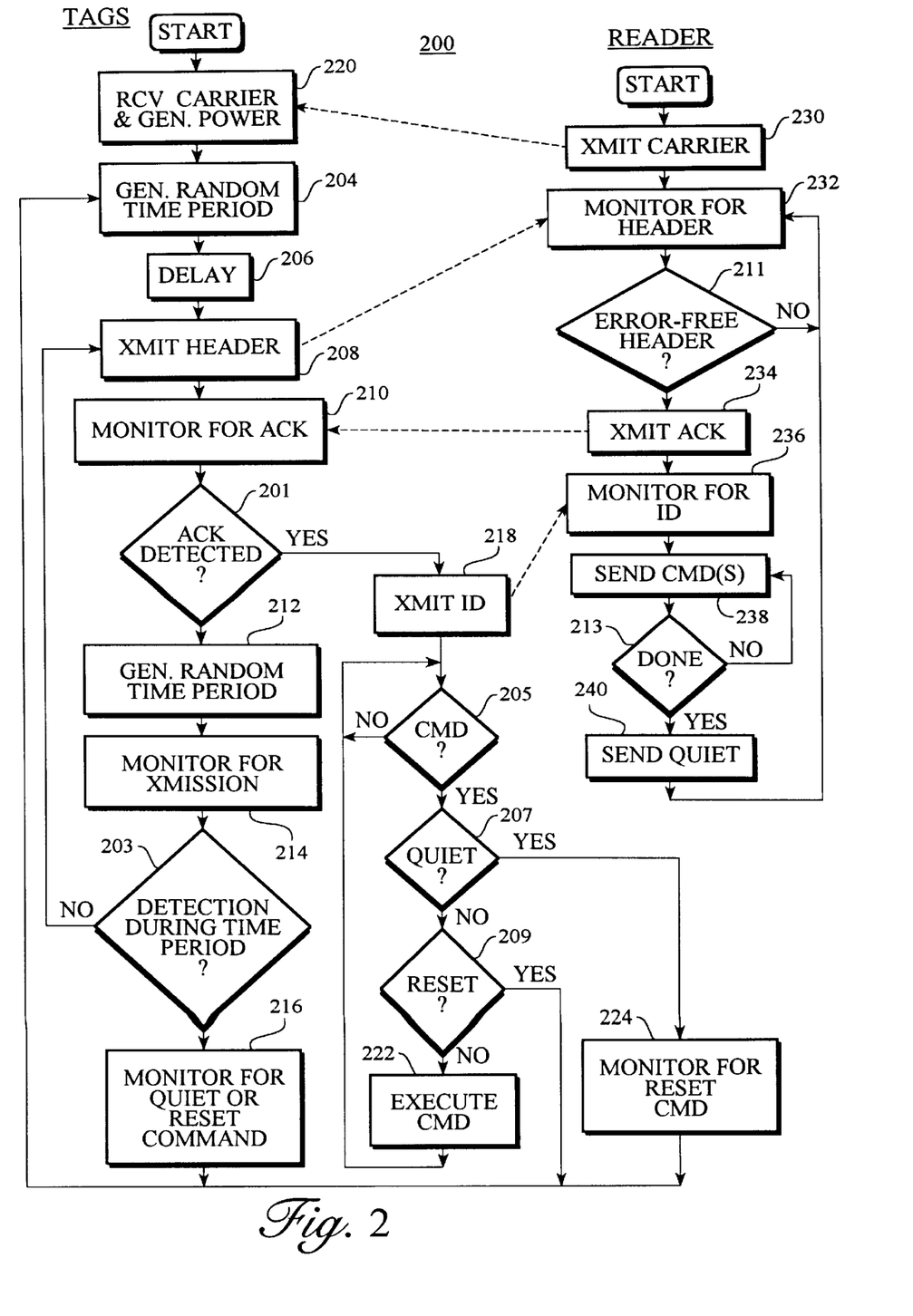
FIG. 2 is a flow chart of the processing in accordance with the present invention.

Referring to FIGS. 1B and 2, the sequence of events which occur in tags 20–28 and in reader unit 10 are shown in flow chart 200. Each tag is powered up upon receiving an RF carrier signal from reader unit 10, step 202. After running through an initializing sequence, each tag generates a random time period, step 204. Many techniques exist for producing a random number. For example, an identification number stored in the tag can serve as a seed for a random number generator. Alternatively, a separate memory location in the tag can be allocated to contain the seed. This would permit the user to individually seed each tag with a different seed number. Yet another technique is to derive the seed from an error detection code corresponding to the identification number of the tag, such as a cyclic redundancy check code.

Next, each tag delays processing for a period of time equal to the randomly generated time, step 206. In principle, each of the tags will have a different delay period by virtue of their randomly selected time periods. Upon expiration of the delay period, each tag transmits a header to reader unit 10, step 208. In the preferred embodiment, the header is a 4-bit datum that is the same value for each tag. This approach simplifies the design of the reader unit, since the reader unit then need only detect an error-free reception of the 4-bit datum. Alternatively, the header can be a subset of each tag's identification number. In another embodiment, a memory location is allocated for storing a user-specified header. It is noted that the header is not limited to four bits and can be a longer or shorter bit pattern.

After transmitting the header, each tag monitors for the transmission of an ACK pulse from the reader unit, step 210. As will be explained in further detail, the ACK pulse must be detected during a specific portion of a period of time subsequent to the transmission of the header. This period of time is referred to as the listening window.

In alternative embodiments, the ACK pulse may be replaced with a command such as a re-transmit header command or the like. The actual content of the transmission is not important, so long as the reader unit initiates a transmission during the specific portion of the listening window.

Continuing from step 210, if an ACK pulse is detected within the required portion of the listening window, step 201, then the tag which detected the ACK will transmit its identification number (ID), step 218, and proceed to monitor for commands sent from reader unit 10, step 205. This tag is said to be selected. If a command is not received by the selected tag during another listening window subsequent to the transmission of the ID, then the selected tag will repeat step 218. However, if the selected tag does receive a command, then a check is made to determine if it is a SET QUIET command, step 207. If the command is not the SET QUIET command, then a check is made to determine if it is a RESET QUIET command, step 209. If a RESET QUIET command was sent, then processing resumes at step 204. Otherwise, the tag executes the command which may involve additional transmissions between reader unit 10 and the tag, step 222. Upon completion of the command, the tag is ready for the next command, step 205, and resumes monitoring for additional commands. Returning to decision step 207, if the SET QUIET command is received, the tag goes into a state wherein subsequent commands from the reader unit are ignored with the exception of a RESET QUIET command, step 224, at which point the tag resumes processing at step 204.

Preferably, the ID for each tag is unique and includes error detection information. Thus, in the unlikely chance that two or more tags transmit their headers (step 208) at exactly the same time, the reader unit will subsequently detect such an occurrence by detecting an error in the reception of the ID code (step 236). The reader unit can then resolve the conflict by sending a RESET QUIET command and starting the sequence all over.

Return now to decision step 201, if an ACK is not detected during the listening window, the tag is said to be unselected. All unselected tags generate a new random period of time at this point, step 212. The unselected tags monitor for any transmissions from reader unit 10 during their respective randomly generated periods of time, step 214. If any such transmissions are detected, step 203, it means there is a selected tag in the interrogation field with which the reader unit is communicating. That being the case, the unselected tags will go into a continuous monitoring state (loosely referred to as an infinite listening window) until a SET QUIET command or a RESET QUIET is detected, step 216, at which time the unselected tags will resume processing at step 204.

Returning to decision step 203, if a transmission is not detected during the unselected tag's random time period, it is deemed that the reader unit is not in communication with any tag (i.e. none of the tags have been selected), in which case the tag continues processing at step 208 in an attempt to catch the attention of the reader unit.

Two points worth noting at this time. First, the SET QUIET command serves a dual function: (i) the SET QUIET command causes the selected tag to go into an infinite listening mode until a RESET QUIET command is detected (step 224), or until it is powered down by the cessation of the RF carrier signal from the reader unit; and (ii) the SET QUIET command causes the unselected tags to "wake up" from their infinite listening window (step 216) and proceed to attempt to gain access to the reader unit. Thus the reader unit, by the transmission of the one SET QUIET command, puts to sleep the selected tag upon concluding business with it and wakes up the unselected tags, indicating that the reader unit is ready for transactions with another tag. This gives every unselected tag a chance to follow the same sequence as the selected tags. Second, the RESET QUIET command has the effect of informing all the tags (including the selected tag) that they can attempt to gain the attention of the reader unit (steps 216 and 224).

In the present implementation of the invention, the SET QUIET command causes the selected tag to set a QUIET bit in its memory store. This bit disables the modulation circuitry in the tag so that the tag is unable to transmit anything to the reader unit. The RESET QUIET command resets the QUIET bit, thus re-enabling the modulation circuitry.

In addition, the tag supports global commands. Global commands are those which are acted upon by all tags, whether selected or unselected. An example of a global command is the RESET QUIET command. Not all global commands result in the transmission of signals by the tags, however. For example, unlike the RESET QUIET command, a global WRITE WORD command causes each tag to write into its non-volatile memory information sent by the reader unit, without the affecting the selected/unselected state of the tag.

Returning to flow chart 200, processing in reader unit 10 begins with transmitting an RF carrier signal, step 230. This provides the power to initialize the tags. Next, reader unit 10 monitors for the reception of an error-free header from one of the tags, steps 232 and 211. Upon detecting an error-free header, the reader unit transmits an ACK pulse during a period of time subsequent to the detection of the error-free header, step 234. This period of time will coincide with the listening window of one of the tags, namely the tag whose header was successfully detected. Next, the reader unit will monitor for the reception of an ID code from the selected tag, step 236. Upon receiving the ID code, the reader unit will transmit one or more commands to the selected tag to effectuate the operation(s) desired of the selected tag, steps 238 and 213. When the reader unit has concluded its transactions with the selected tag, it will transmit a QUIET command, step 240, and resume monitoring for another header, step 232.

Figure 3:
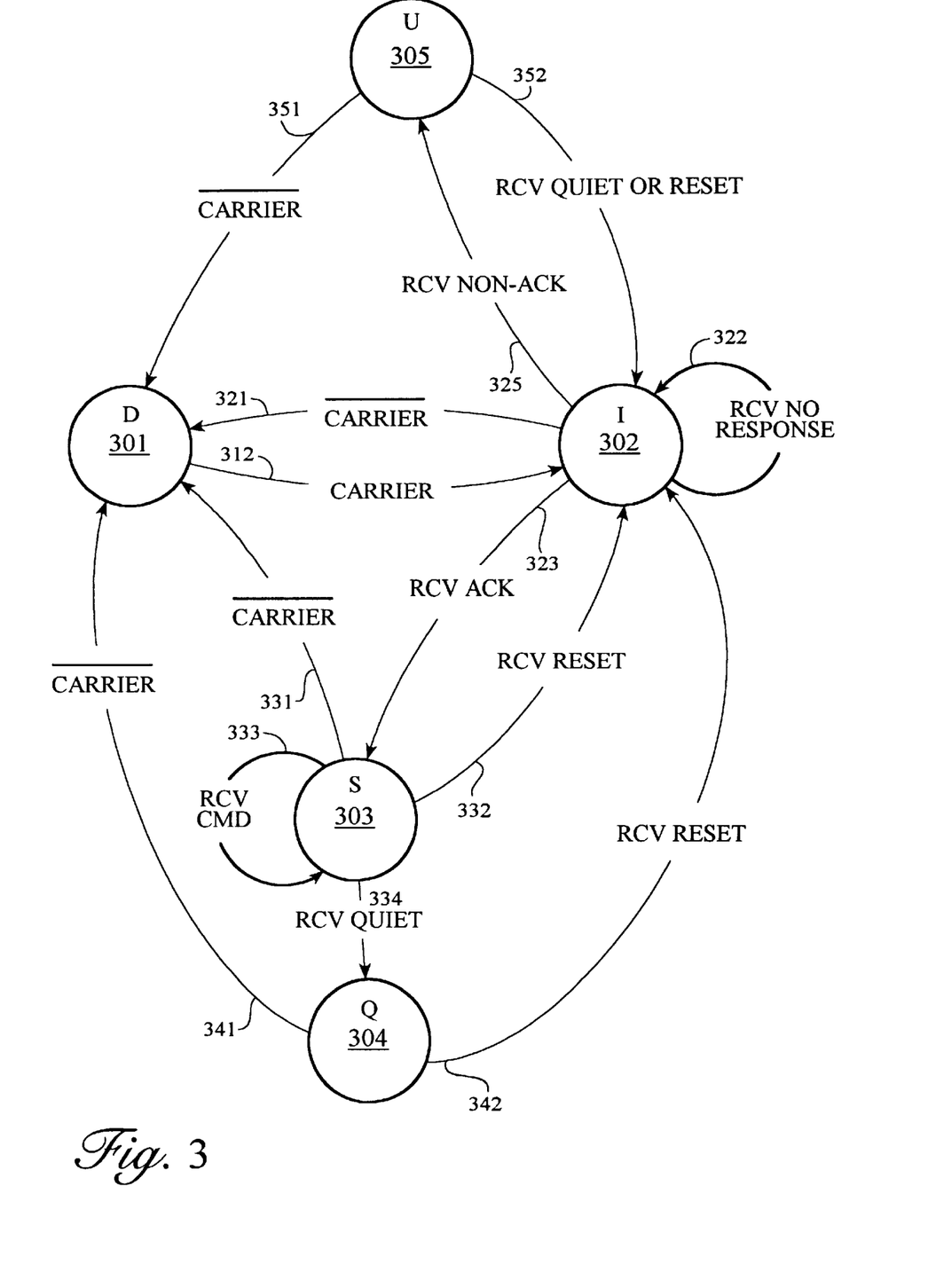
FIG. 3 is a state transition diagram showing the state transitions which occur in a remote unit.

Referring now to FIG. 3, it can be seen that a tag exists in any of five possible states: a power down state 301, an initialized state 302, a selected state 303, a quiet state 304, and an unselected state 305. Thus, while flow chart 200 shows a specific implementation of the method of the present invention, state diagram 300 provides a more abstract description of the behavior of the tags in accordance with the invention irrespective of any implementation specific considerations.

A tag initially is in the powered down state 301. This is the condition when the reader unit (base station) is not transmitting any RF carrier. Upon receiving RF carrier, the tag will transition (312) to the initialized state. Conversely, a tag will transition (321, 331, 341, 351) back to the powered down state from any other state when RF carrier is removed.

During the initialized state, each tag transmits its header at random intervals. A tag moves (323) into the selected state 303 upon detecting an ACK pulse during a specific period of time of its listening window. Alternatively, the tag moves (325) into the unselected state 305 if the tag detects any transmission from the reader unit outside of its listening window. From the unselected state, the tag transitions (352) back to the idle state upon detecting a SET QUIET command or a RESET QUIET command.

If the tag does not detect any transmission during a time period subsequent to its listening window, then the tag remains (322) in the initialized state and continues transmitting its header at random intervals.

Upon reaching the selected state 303, the tag remains there (333) so long as it receives commands from the reader unit. The tag transitions (334) from the selected state 303 to the quiet state 304 when the SET QUIET command is detected. The tag remains in the quiet state, until it detects the RESET QUIET command at which time it transitions (342) to the idle state. The tag transitions (332) from the selected state to the idle state 302 when a RESET QUIET command is detected.

Figure 4A:
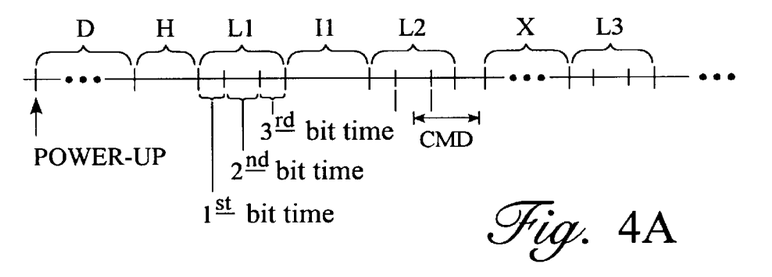
FIGS. 4A–4C are time lines showing the various events which occur in a remote unit.
Figure 4B:
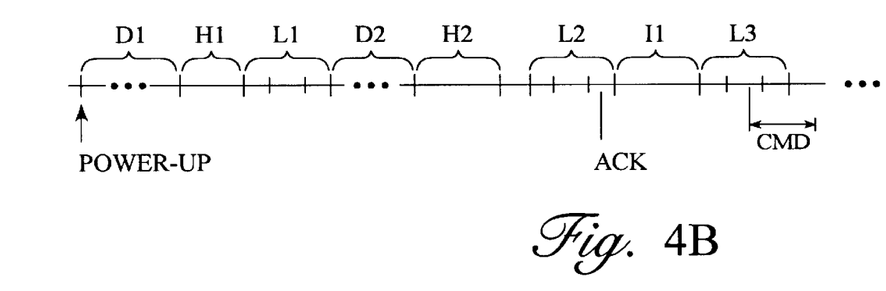
Figure 4C:
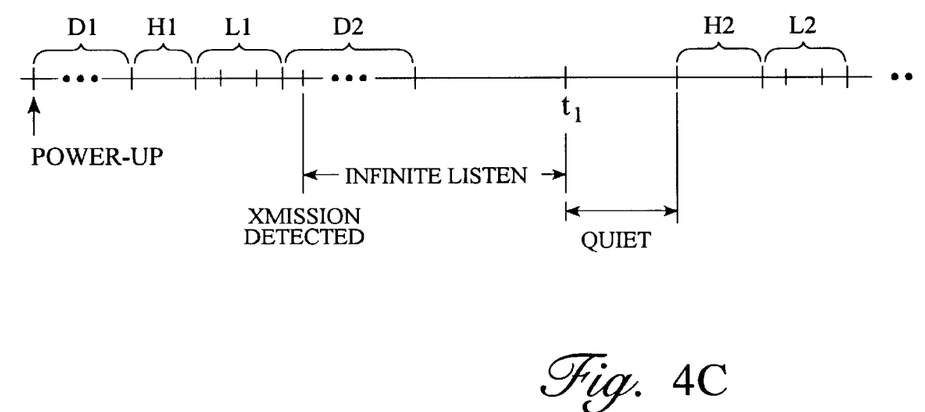

Referring to FIGS. 4A–4C, time lines of the events which take place in a tag begin with a power up event which occurs when the reader unit broadcasts the RF carrier signal. Each tag delays for a randomly selected period of time as indicated in FIG. 4A by time period D. Next, the tag transmits its header during time period H. This is followed by a listening window L1.

A close inspection of FIG. 4A shows that listening window L1 comprises first, second and third bit times. The RF carrier signal serves as the time base for both the reader unit and the tags. Each cycle of the RF carrier is a clock cycle. Thus, a bit time is defined as the passage of a number of carrier cycles (clocks) of the RF carrier signal. In one embodiment of the invention, the RF carrier is a 13.56 MHz signal and a bit time can be defined in the range of 64 clocks/bit to 1024 clocks/bit. In another embodiment, the RF carrier is 125 KHz, having a bit time that can be in the range of 8 clocks/bit to 128 clocks/bit. Since the RF carrier is broadcast from the reader unit to each of the tags, a common time base for both the reader unit and the tags is provided for the purpose of measuring the passage of time.

Returning to FIG. 4A, recall that detection of an ACK pulse from the reader unit subsequent to the transmission of the header by the tag occurs during listening window L1. In accordance with the present invention, the tag looks for the ACK pulse to occur any time after the first bit time of the listening window and before the end of the second bit time. Consider for example a reader/tag system operating with a 125 KHz carrier and using a bit time of 8 clocks/bit (i.e. one bit time is 64 $\mu$S). After transmission of its header, a tag will delay for at least 64 $\mu$S (end of first bit time) before monitoring for the detection of an ACK pulse from the reader unit. Similarly, the reader unit, upon receiving an error-free header, will delay for at least 64 $\mu$S before transmitting the ACK pulse after receiving the header.

Continuing with FIG. 4A, assuming an ACK pulse was detected sometime during the second bit times of listening window L1, the selected tag will then transmit its ID code during time period I1. The tag then enters another listening window L2 and waits for the transmission of a command from the reader unit. Preferably, the tag will look only during the second bit time for the transmission of the entire command. In fact, in the preferred embodiment, even the ACK pulse is transmitted within the second bit time. By ignoring the first and third bit times, the tag avoids the possibility of erroneously detecting its own transmission as incoming from the reader unit. Upon receiving the command, the tag proceeds to execute the command during time period X, which may involve additional transmissions with the reader. Upon completion of the command, the tag once again monitors for commands during listening window L3, repeating the above described sequence.

The time line of FIG. 4B shows a scenario where the tag has not detected an ACK during listening window L1. In accordance with the invention, the tag continues to listen for a randomly selected time period D2. If no transmission is detected still, then the tag re-transmits its header at time period H2 and repeats the listening sequence. In this case, an ACK pulse was detected during the third bit time of time period L2. The selected tag then proceeds with transmitting its identification code during time I1 and continue as described above with respect to FIG. 4A.

FIG. 4C illustrates a situation when a transmission is detected after listening window L1, during delay period D2. Recall this indicates that another tag in the interrogation field is selected and the reader unit is in communication with it. In such a case, the tag will enter the unselected state (305, FIG. 3) and go into an infinite listening window, monitoring for the transmission of the QUIET command or a global command. FIG. 4C shows that at time t1 a QUIET command issues. Upon the detection of the command, the tag wakes up and once again attempts to gain the attention of the reader unit by transmitting its header (step 208, FIG. 2).

What is claimed is:

1. A method of communication between a control unit and a plurality of remote units, comprising:

for each of the remote units:
   a) selecting a random period of time and delaying transmission from the remote for said period of time;
   b) after delaying, transmitting first information from the remote unit to the control unit;
   c) monitoring for the detection of a transmission from the control unit;
   d) if a transmission from the control unit is detected during a first window of time subsequent to transmitting the first information, then transmitting second information to the control unit and monitoring for a transmission of one of a first set of commands from the control unit, such a remote unit being referred to as a selected remote unit;
   e) if a transmission from the control unit is detected prior to or subsequent to the first window of time, then monitoring for the detection of of a second command from the control unit, said second command being exclusive of the first set of commands, such remote units being referred to as unselected remote units;
   f) if a transmission from the control unit is not detected after an amount of time following the first window of time, then repeating the steps (b)–(f); and
   g) if the selected remote unit detects a transmission of said second command from the control unit then monitoring for a transmission of a third command from the control unit and responding only to the third command.

2. The method of claim 1 further including selecting a random period of time as the amount of time used in step (f).

3. The method of claim 1 wherein said monitoring of one of said first set of commands in step (d) further includes substeps of:
   (i) monitoring for the detection of said one of said first set of commands from the control unit during a second period of time;
   (ii) if said one of said first set of commands is detected during the second period of time, then processing the command;
   (iii) if said one of said first set of commands from the control unit is not detected during the second period of time, then transmitting the second information; and
   (iv) repeating substeps (i)–(iv).

4. The method of claim 1 wherein step (e) further includes, in response to detecting said second command, repeating steps (a)–(f).

5. The method of claim 4 wherein if the unselected remote units detect a transmission of the third command then delaying for a randomly selected period of time and transmitting the first information.

6. The method of claim 5 further including broadcasting a master signal from the control unit to the remote units and deriving a timing signal from the master signal; whereby the timing signal is used by the control unit and each of the remote units as the basis for measuring time.

7. The method of claim 1 wherein the step of transmitting the first information is a step of transmitting a bit pattern that is the same for each of the remote units.

8. The method of claim 1 further including providing a local memory store in each of the remote units and storing user specified bit patterns in the local memory stores; wherein the step of transmitting the first information is a step of transmitting the bit pattern stored in the local memory store.

9. A method of communication between a plurality of radio frequency transponders (tags) and a reader unit, comprising:

powering up each of the tags;

in the reader unit, broadcasting a cyclic timing signal to the tags, said cyclic timing signal being a time base for both said reader unit and the tags;

a listening time window defined by at least three equal time segments, said time segments being defined by an integral number of cycles of said cyclic time signal;

in each tag, delaying transmission to the reader unit for a random period of time, and upon the expiration thereof transmitting a first bit pattern to the reader unit and monitoring for an acknowledge signal to occur during a predetermined time segment of said listening window, said predetermined time segment being any time segment within said listening window other than the first and last time segments of said listening window;

in the reader unit, detecting for an error-free reception of the first bit pattern and transmitting said acknowledge signal during a first period of time subsequent to detecting the error-free reception;

if the predetermined time segment of one of the tags is substantially coincident with the first period of time then transmitting a second bit pattern from such a tag and monitoring for a transmission of one of a first set of commands from the reader unit, such a tag being referred to as the selected tag, maintaining a bidirectional exchange of communication between said selected tag and said reader unit until said reader unit transmits a second command exclusive of said first set of commands;

if, in any of the tags, a transmission is detected outside of the predetermined time segment then monitoring for a transmission of said second command from the reader unit, the second command being exclusive of the first set of commands, such tags being referred to as unselected tags, said unselected tags transmitting said first bit pattern in response to detection of said second command; and if, in any of the tags, a transmission is not detected for a randomly selected period of time subsequent to the listening window then transmitting the first bit pattern.

10. The method of claim 9 further including selecting a fixed pattern of bits to be used as the first bit pattern in each of the tags.

11. The method of claim 9 wherein said time window is divided into only three equal time segments, said method further including inputting a user-provided bit pattern to be used as the first bit pattern, whereby each of the tags can be assigned a different user-provided bit pattern.

12. The method of claim 9 wherein if the selected tag detects a transmission of the second command from the reader unit then monitoring for a transmission of a third command from the reader unit and responding only to the third command.

13. The method of claim 12 wherein the selected tag, subsequent to detecting the second command, ignores the reception of all commands except for the third command.

14. The method of claim 12 wherein if the unselected tags detect a transmission of the second command then delaying for a randomly selected period of time and transmitting the first bit pattern.

15. The method of claim 14 wherein if the unselected tags detect a transmission of the third command then delaying for a randomly selected period of time and transmitting the first bit pattern.

16. The method of claim 15 wherein the second command is a SET QUIET BIT command and the third command is a RESET QUIET BIT command.

17. The method of claim 9 wherein powering each of the tags includes broadcasting a carrier frequency signal from the reader unit and, in each of the tags, rectifying the received carrier frequency signal to produce power.

18. The method of claim 17 further including measuring the passage of time in the reader unit and in the tags based on the carrier frequency signal.

19. A method of communication between a plurality of radio frequency transponders (tags) and a reader unit, comprising:

in each tag, delaying transmission to the reader unit for a random period of time, and upon the expiration thereof transmitting a first bit pattern to the reader unit and monitoring for an acknowledge signal to occur during a listening window;

in the reader unit, detecting for an error-free reception of the first bit pattern and transmitting an acknowledge signal during a first period of time subsequent to detecting the error-free reception;

if the listening window of one of the tags is substantially coincident with the first period of time then transmitting a second bit pattern from such a tag and monitoring for a transmission of one of a first set of commands from the reader unit, such a tag being referred to as the selected tag;

if, in any of the tags, a transmission is detected outside of the listening window then monitoring for a transmission of a second command from the reader unit, said second command being exclusive of said first set of commands, such tags being referred to as unselected tags;

if, in any of the tags, a transmission is not detected for a randomly selected period of time subsequent to the listening window then transmitting said first bit pattern; and if the selected tag detects a transmission of said second command from the reader unit then monitoring for a transmission of a third command from the reader unit and responding only to said third command.

20. The method of claim 19 further including selecting a fixed pattern of bits to be used as said first bit pattern in each of the tags.

21. The method of claim 19 further including inputting a user-provided bit pattern to be used as said first bit pattern, whereby each of the tags can be assigned a different user-provided bit pattern.

22. The method of claim 19 wherein the selected tag, subsequent to detecting said second command, ignores the reception of all commands except for said third command.

23. The method of claim 19 wherein if the unselected tags detect a transmission of said second command then delaying for a randomly selected period of time and transmitting said first bit pattern.

24. The method of claim 23 wherein if the unselected tags detect a transmission of said third command then delaying for a randomly selected period of time and transmitting said first bit pattern.

25. The method of claim 24 wherein said second command is a SET QUIET BIT command and said third command is a RESET QUIET BIT command.

26. The method of claim 19 further including an initial step of powering up each of the tags, said powering up of each of the tags including broadcasting a carrier frequency signal from the reader unit and, in each of the tags, rectifying the received carrier frequency signal to produce power.

27. The method of claim 26 further including measuring the passage of time in the reader unit and in the tags based on the carrier frequency signal.

* * * * *